United States Patent [19]
Dahl et al.

[11] Patent Number: 5,291,261
[45] Date of Patent: * Mar. 1, 1994

[54] OPTICAL OBJECT DETECTION SYSTEM INCORPORATING FIBER OPTIC COUPLING

[75] Inventors: Randy Dahl, Mesa, Ariz.; Sanjar Ghaem, Palatine, Ill.

[73] Assignee: Motorola, Inc., Schaumburg, Ill.

[*] Notice: The portion of the term of this patent subsequent to Apr. 6, 2009 has been disclaimed.

[21] Appl. No.: 475,543

[22] Filed: Feb. 6, 1990

[51] Int. Cl.$^5$ .......................... G01C 3/00; B60Q 1/00; H01J 40/14

[52] U.S. Cl. ............................ 356/1; 356/4; 340/435; 250/208.2; 250/208.3; 250/561; 250/578.1; 250/232

[58] Field of Search ............. 356/1, 41; 340/435, 340/904; 250/208.2, 208.3, 222.1, 561, 578.1, 341, 233, 349, 232, 350

[56] References Cited

U.S. PATENT DOCUMENTS

| | | | |
|---|---|---|---|
| 3,327,584 | 6/1967 | Kissinger | 356/1 |
| 4,515,479 | 5/1985 | Pryor | 250/561 X |
| 4,582,424 | 4/1986 | Kawabata | 356/1 |
| 4,634,272 | 1/1987 | Endo | 356/5 |
| 4,653,905 | 3/1987 | Farrar et al. | 356/4 |
| 4,692,611 | 9/1987 | Hoogenboom | 250/561 |
| 4,740,806 | 4/1988 | Takehana | 356/1 X |
| 4,752,799 | 6/1988 | Stauffer | 356/1 X |
| 4,766,323 | 8/1988 | Franklin et al. | 356/1 X |
| 4,818,887 | 4/1989 | Weishaupt et al. | 356/1 X |

Primary Examiner—Linda J. Wallace

[57] ABSTRACT

A system (4) for use in an automobile (2) for the detection of objects comprising: a light source (6); a plurality of spaced transmitter ports (10, 12) for respectively transmitting light to a plurality of fields of illumination (18, 20); an optical fiber coupling the light source to the transmitter ports; a plurality of receiver ports (10, 12) embracing respectively a plurality of fields of reception (34, 36) each having an area of overlap (38, 40, 42, 44) with each of the plurality of fields of illumination so as to receive light transmitted from one of the transmitter ports and reflected by an object present in an area of overlap; a receiver (22) for receiving light and for producing a signal representative thereof; an optical fiber (24) coupling the receiver ports to the receiver; and processing means (52) for sequentially activating each of the transmitter ports with each of the receiver ports, and for processing the signal produced by the receiver in response to each activation to detect the presence of an object in each of the areas of overlap.

25 Claims, 4 Drawing Sheets

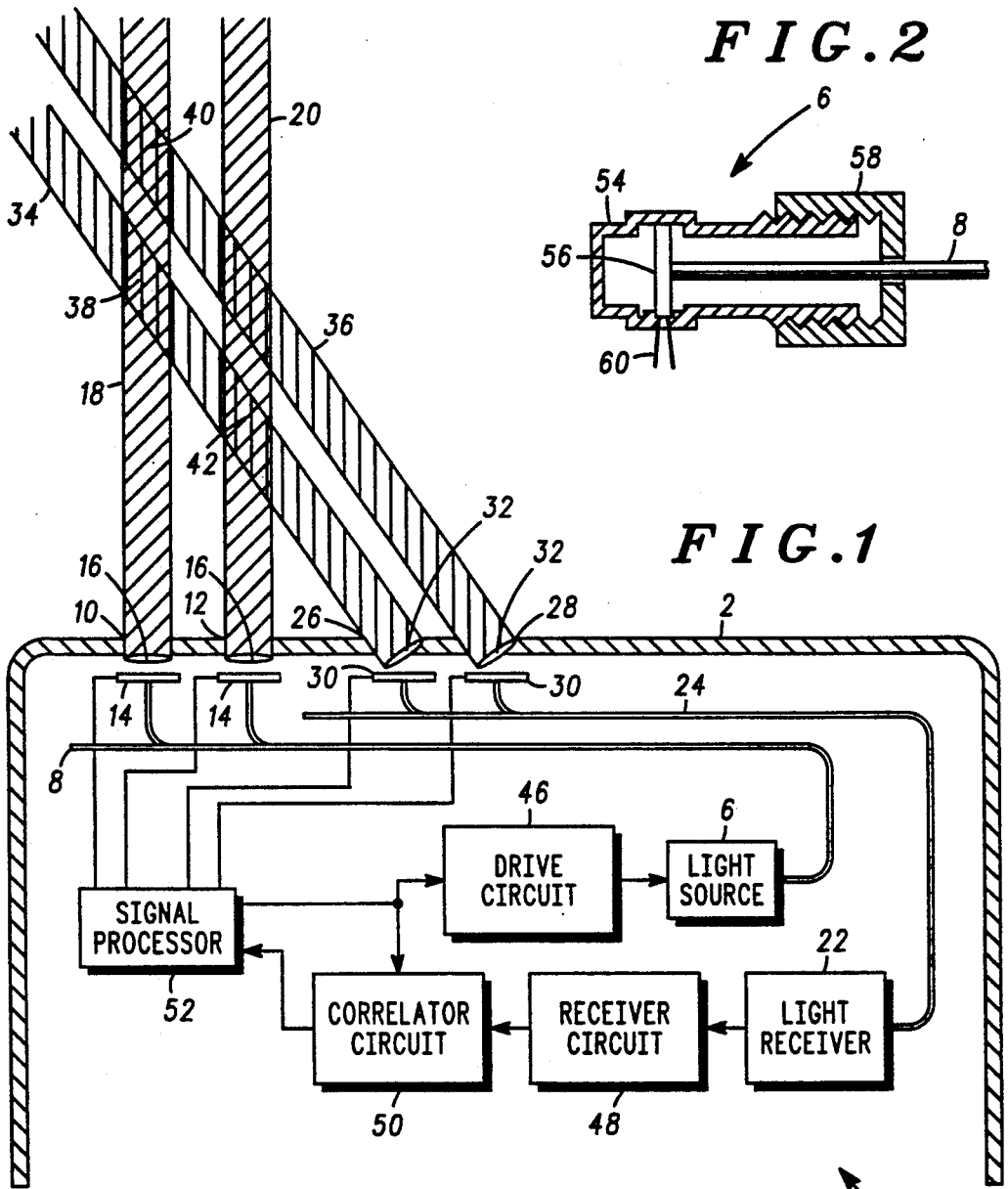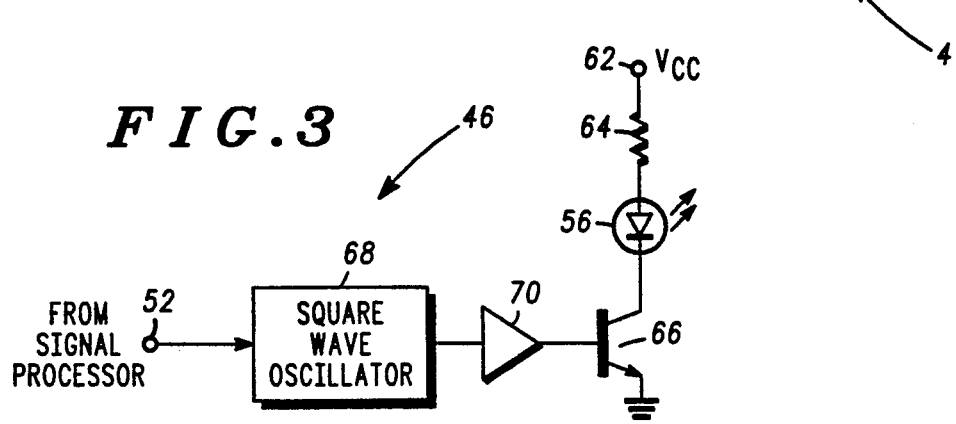

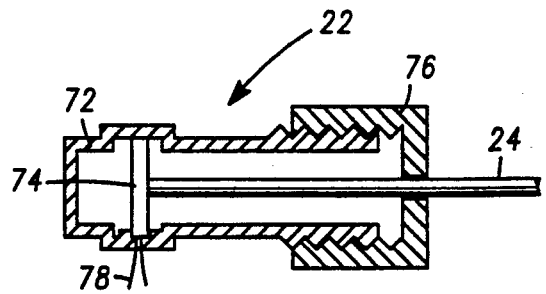
*FIG.4*
*FIG.5*
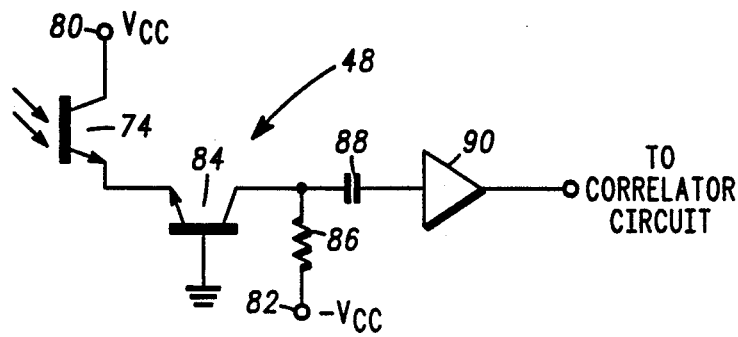
*FIG.6*
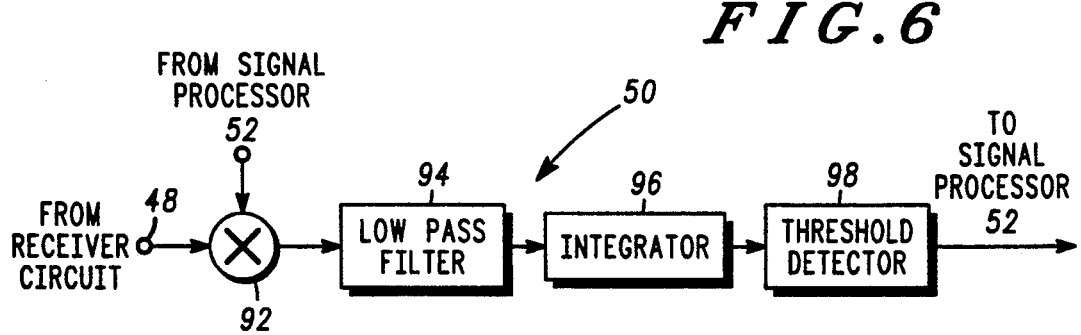
*FIG.7A*
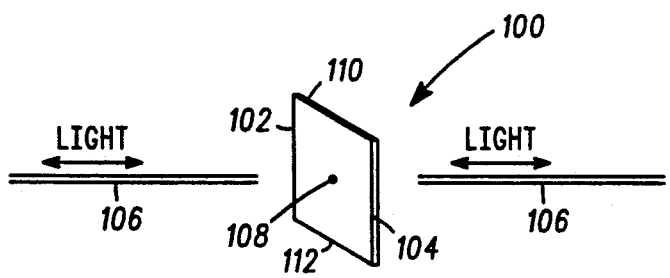
*FIG.7B*
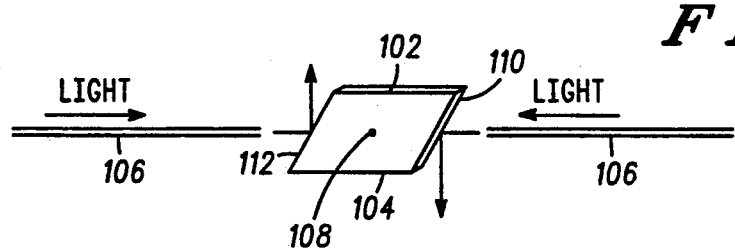

OPTICAL OBJECT DETECTION SYSTEM INCORPORATING FIBER OPTIC COUPLING

BACKGROUND OF THE INVENTION

This invention relates to object detection and particularly, though not exclusively, to the detection of objects in the vicinity of vehicles such as automobiles.

It has long been considered desirable in automobiles to be able automatically to detect nearby vehicles or other objects so as to enable appropriate avoiding action to be taken. It is known to use radar systems to detect nearby vehicles or other objects, and in particular it is known, for example from U.S. Pat. Nos. 4,552,456 and 4,632,543, to use an optical radar. However, the complexity and cost of existing radar systems have heretofor prevented their general incorporation in automobiles.

For the avoidance of doubt and for the purpose of clarification, it should be understood that as used herein the term "plurality" is intended to mean "two or more" and the term "multiplicity" is intended to mean "three or more".

OBJECTS OF THE INVENTION

It is an object of the present invention to provide a new and improved system for the detection of objects wherein the above mentioned disadvantages may be overcome or at least alleviated.

In a preferred embodiment the invention thus provides a simple, reliable object detection system which is of low cost, uses parts which are few in number and are from a mature technology base, and which is readily suited to implementation and conditions encountered in an automobile.

BRIEF DESCRIPTION OF THE DRAWINGS

One system in accordance with the present invention for use in an automobile when reversing for the detection of objects will now be described, by way of example only, with reference to the accompanying drawings, in which:

FIG. 1 shows a schematic plan view of the rear of an automobile incorporating the system; and FIG. 2 shows a cross-sectional diagram of an optical transmitter used in the system of FIG. 1;

FIG. 3 shows a part-schematic circuit diagram of an electrical transmitter circuit for driving the optical transmitter of FIG. 2;

FIG. 4 shows a cross-sectional diagram of an optical receiver used in the system of FIG. 1;

FIG. 5 shows a circuit diagram of an electrical receiver circuit for use with the optical receiver of FIG. 4;

FIG. 6 shows a block-schematic circuit diagram of a correlator used in the system of FIG. 1;

FIGS. 7(a) and 7(b) show different modes of operation of a shutter mechanism used in the system of FIG. 1.

DESCRIPTION OF THE PREFERRED EMBODIMENT

Figure 8A:
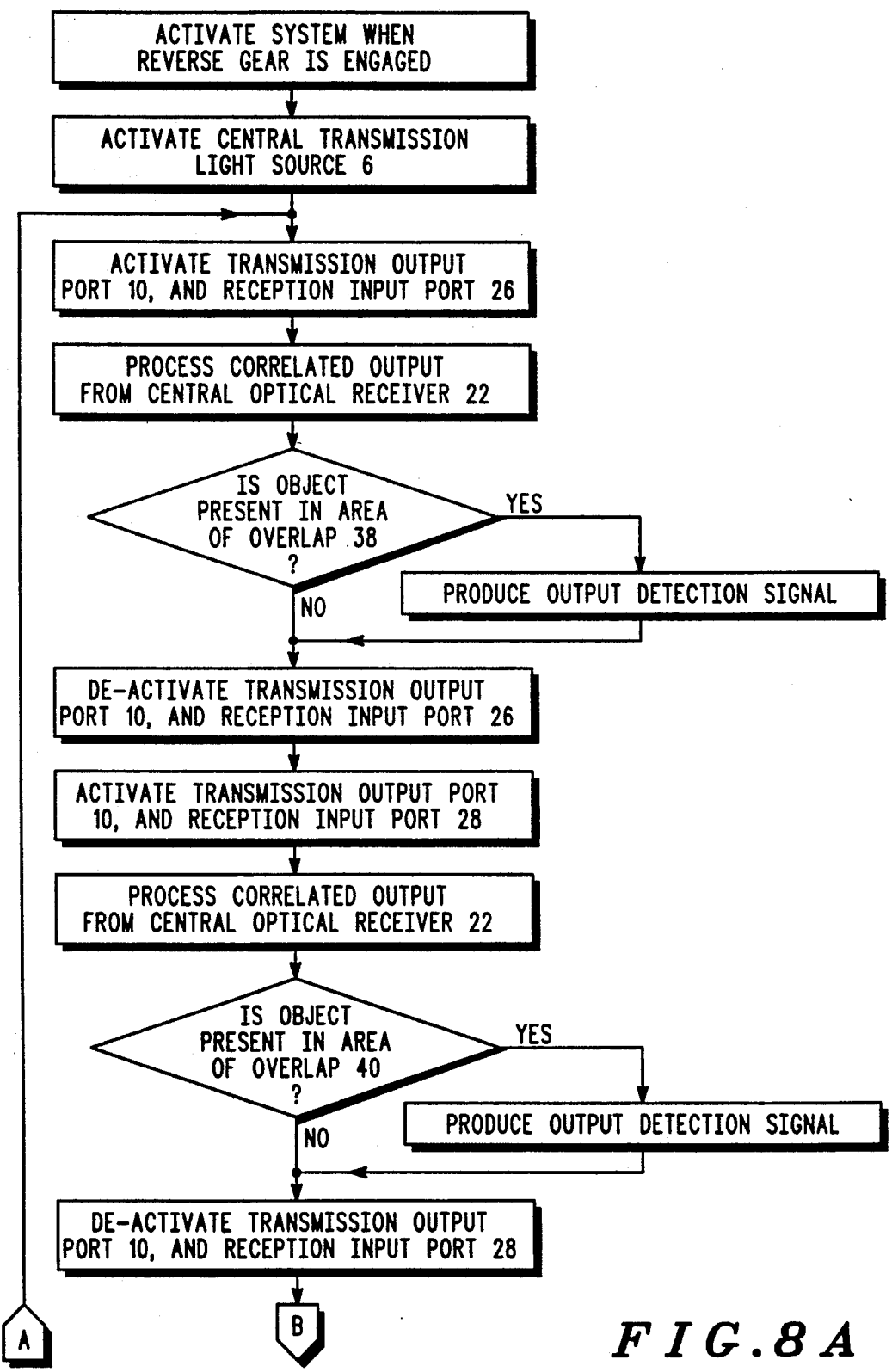
FIGS. 8A and 8B show a flow chart illustrating operation of a signal processor of the system.

Referring now to FIG. 1, an automobile 2 has an object detection system 4 for use when the automobile is reversing at slow speed to detect objects at close range. The object detection system 4 includes a single central transmitter light source 6 (which will be described in further detail below) and a transmission optical fiber 8. The transmission optical fiber 8 extends from the transmitter light source 6 and around the rear periphery of the automobile 2. The transmission optical fiber 8 is provided along its length at a number of spaced points (only two of which are shown) around the rear periphery of the automobile with output ports 10, 12 through which part of the light from the fiber emerges through apertures in a panel or bumper of the automobile 2. Each output port is formed by a short optical fiber joined to the transmission optical fiber by a conventional optical splitter (not shown). At each output port 10, 12 there is provided a shutter 14 (which will be described in further detail below) for switching off and on light emerging from the output port and a beam shaping lens 16 (e.g. a conventional spherical optical lens or a graded index of refraction (GRIN) lens) for focussing light emerging from the shutter into parallel beams covering predetermined fields of illumination 18, 20.

The object detection system 4 includes a single central light receiver 22 (which will be described in further detail below) and a reception optical fiber 24. The reception optical fiber 24 extends around the rear periphery of the automobile 2 and to the light receiver 22. The reception optical fiber 24 is provided along its length at a number of spaced points (only two of which are shown) around the rear periphery of the automobile with input ports 26, 28 through which exterior light is introduced into the fiber through apertures in the panel or bumper of the automobile 2. Each input port is formed by a short optical fiber joined to the reception optical fiber 24 by a conventional optical splitter/combiner, such as a fuzed-junction star coupler (not shown). At each input port 26, 28 there is provided a shutter 30 (which will be described in further detail below) for switching off and on exterior light to the input port and a beam shaping lens 32 (e.g. a conventional spherical optical lens or a graded index of refraction (GRIN) lens) for focussing exterior light to the shutter from respective parallel beams covering predetermined fields of reception 34, 36.

The fields of illumination 18, 20 and the fields of reception 34, 36 are arranged to overlap so as to define four co-planar areas of overlap: (i) an area of overlap 38 between the field of illumination 18 and the field of reception 34, (ii) an area of overlap 40 between the field of illumination 18 and the field of reception 36, (iii) an area of overlap 42 between the field of illumination 20 and the field of reception 34, and (iv) an area of overlap 44 between the field of illumination 20 and the field of reception 36.

The object detection system 4 further includes an electrical driver circuit 46 for driving the single central transmitter light source 6, an electrical receiver circuit 48, an electrical correlator circuit 50 for correlating signals from the optical receiver 20 with signals to the transmitter light source 6, and a signal processor 52 for generating activation and switching signals for the transmitter light source 6 and the transmission and reception shutters 14, 30 and for processing the correlated receiver signals to produce an output detection signal.

Referring now to FIG. 2, in a preferred embodiment of the present invention the single central optical transmitter 6 includes a housing 54 holding a light emitting diode (LED) 56 of the type sold under the part no.

MFOE71 by Motorola, Inc., Semiconductor Products Sector, 3102 North 56th Street, Phoenix, Ariz. 85018. The transmission optical fiber 8 (e.g. that sold under the part no. ESKA SH4001 by Mitsubishi International, Tokyo, Japan) is coupled to the LED 56 and is held in place by a screw-thread "cinch" connector 58 which fastens to the housing and through which the optical fiber 8 passes. Electrical inputs 60 of the LED 56 are connected to the transmitter driver circuit 46. It will be appreciated that, if desired, another kind of LED or other light source may alternatively be used, e.g. a semiconductor laser diode.

Referring now to FIG. 3, in a preferred embodiment of the present invention the transmitter driver circuit 46 includes a voltage supply node 62 for coupling to a source of positive voltage supply $V_{cc}$, a resistor 64 having one end connected to the voltage supply node 62 and having its other end connected to the LED 56, and a bipolar npn transistor 66. The transistor 66, which may be of the type sold under the part no. 2N2222 by Motorola, Inc. Semiconductor Products Sector, 3102 North 56th Street, Phoenix, Ariz. 85018, has its emitter connected to ground and has its collector connected to the LED 56. A conventional square wave oscillator 68, controlled by the signal processor 52, is connected to the base of the transistor 64 via a conventional buffer 70. Thus, when activated by the signal processor 52 the transmitter driver circuit 46 causes the LED 56 to emit a train of pulses of light of a predetermined frequency.

Referring now to FIG. 4, in a preferred embodiment of the present invention the single central optical receiver 22 includes a housing 72 holding a semiconductor light detector 74 of the type sold under the part no. MFOD72 by Motorola, Inc. Semiconductor Products Sector, 3102 North 56th Street, Phoenix, Ariz. 85018. The reception optical fiber 24 (e.g. of the same part no. ESKA SH4001 as the transmission optical fiber 8) is coupled to the detector 74 and is held in place by a screw-thread "cinch" connector 76 which fastens to the housing and through which the optical fiber 24 passes. Electrical outputs 78 from the light detector 74 are connected to the electrical receiver circuit 48.

Referring now to FIG. 5, in a preferred embodiment of the present invention the electrical receiver circuit 48 includes a voltage supply node 80 for coupling to the source of voltage supply $V_{cc}$ and a voltage supply node 82 for coupling to source of negative voltage supply $-V_{cc}$. The voltage supply node 80 is connected to one side of the light detector 74, and a pnp transistor 84 has its emitter connected to another side of the light detector 74. The transistor 84 has its base connected to ground and has its collector connected to the voltage supply node 82 via a resistor 86. The collector of the transistor 84 is also connected via a capacitor 88 and a buffer amplifier 90 to the correlator circuit 50. Thus the electrical receiver circuit 48 amplifies and buffers the electrical signal output from the light detector 74.

Referring now to FIG. 6, in a preferred embodiment of the present invention the correlator circuit 50 includes a first input for receiving the output of the electrical receiver circuit 48, and a second input for receiving the activation signal applied to the transmitter driver circuit 46. The correlator circuit also includes a conventional mixer 92 for mixing the signals at the two inputs of the circuit. The mixer output is connected via a low-pass filter 94, an integrator 96 and a threshold detector 98 to the signal processor 52. Thus the correlator circuit mixes together the light detector output signal with the transmitted signal, generating a mixed signal having a low-frequency component corresponding to those components of the light detector output signal and the transmitted signal which correlate. The correlator circuit then filters out from the mixed signal any high frequency component(s) which correspond to those component(s) which may be present in the light detector output signal and which do not correlate with the transmitted signal.

Referring now to FIG. 7, in a preferred embodiment of the present invention the shutters 14, 30 associated with each of the output and input ports 10, 12 and 26, 28 are implemented as mechanical shutters formed by a rotatable glass prism 100 located in the path of light to or from the output ports 10, 12 or input ports 34, 36 respectively. In a first position as shown in FIG. 7(a), corresponding to the shutter being open, the prism is positioned with parallel faces 102, 104 each perpendicular to and intersecting with a light path 106, so that the light passes directly through the prism with substantially no reflection. In a second position as shown in FIG. 7(b), corresponding to the shutter being closed, the prism is rotated through approximately 90° about an axis through its center 108 perpendicular to the plane of the drawing so that parallel faces 110, 112 intersect the light path 106 at an acute angle. The faces 110, 112 are coated with a reflective layer such as gold or aluminum so that substantially all of the light incident upon the prism is reflected with substantially no transmission. It will be appreciated that, if desired, another kind of light shutter may alternatively be used, e.g. a liquid crystal device (LCD) shutter, or a fiber optic switch, such as that sold under part no. F12-F-E-1 by DiCon Fiberoptics, Inc., 44140 Warm Springs Blvd., Fremont, Calif. 94539, in which an output optical fiber is moved into and out of alignment with an input optical fiber so as to be transmissive or non-transmissive to to an optical signal therefrom.

Figure 8B:
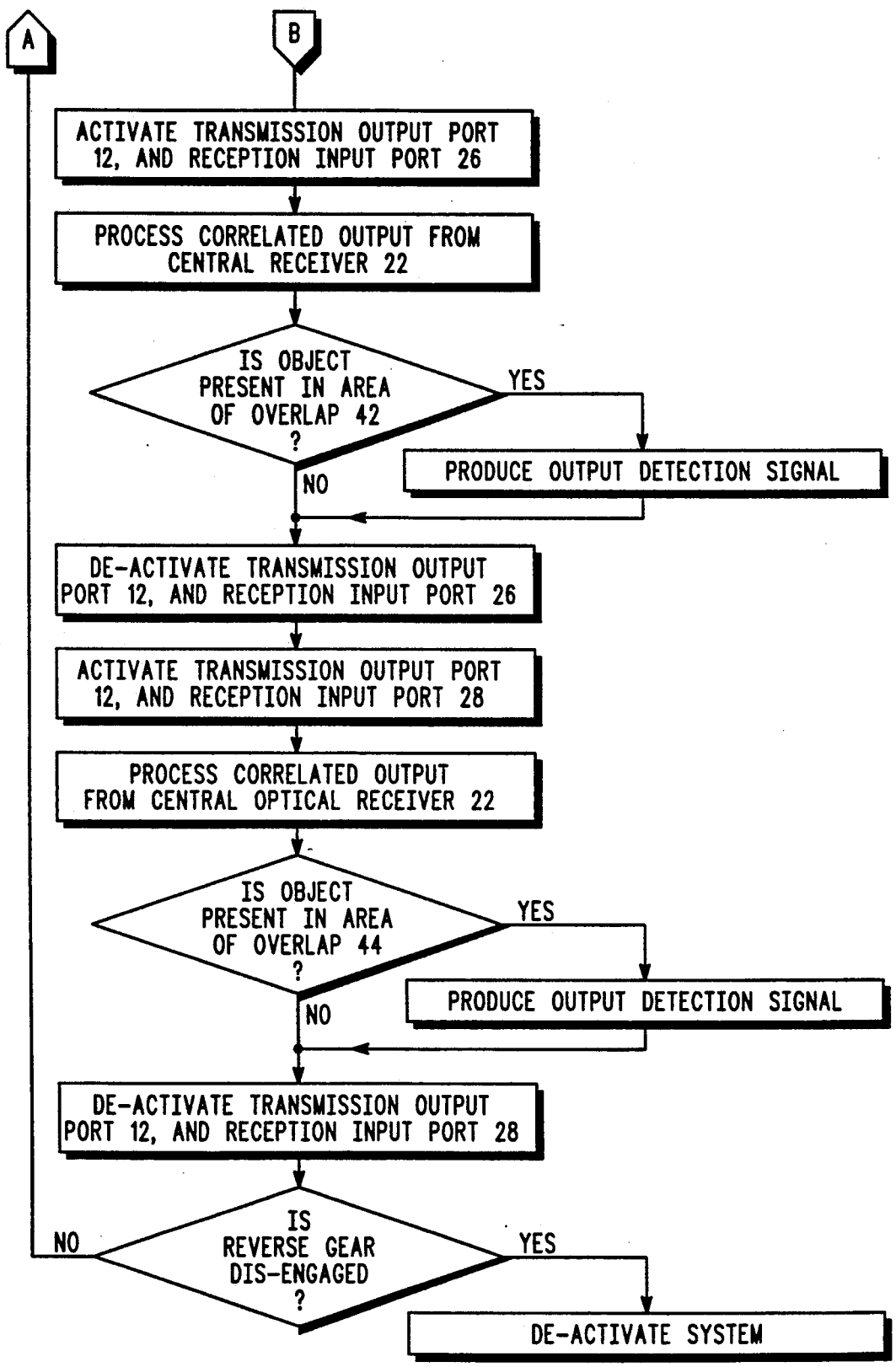

Referring now also to FIG. 8 which shows a flow chart illustrating the operation of the signal processor 52, in use of the object detection system 4 shown in FIG. 1, the system is enabled when the automobile begins reversing, e.g. when reverse gear is engaged. When enabled, the signal processor 52 firstly activates the central transmitter light source 6, and simultaneously activates the transmission shutter 14 associated with the transmission output port 10 and also the reception shutter 30 associated with the reception input port 26. Light is thus transmitted from the output port 10 and illuminates the transmission field 18. If there is an object (such as another automobile, a child, a cycle, or a post) in the area of overlap 38 between the transmission field 18 and the reception field 34, the object will cause light transmitted in the field 18 to be reflected in the field 34 and the reflected light will be introduced into the reception optical fiber 24 at the input port 26 and will be received at the central optical receiver 22. If no object is present in the area of overlap 38, no light will be reflected. Any signal produced from the optical receiver 22 in response to this activation is buffered by the receiver circuit 48, correlated with the transmitter activation signal (so as to minimize errors in detection) by the correlator circuit 50, and processed by the signal processor 52 to produce an output detection signal which may be used to activate a warning signal (e.g. a buzzer, not shown) to the automobile driver or may be used to generate a display (not shown) for viewing by the automobile driver to indicate the location, size and distance of a detected object. The signal processor 52 then de-activates the central transmitter light source 6, the transmission shutter 14 associated with the transmission output port 10 and the reception shutter 30 associated with the reception input port 26.

The signal processor 52 secondly activates the central transmitter light source 6, and simultaneously activates the transmission shutter 14 associated with the transmission output port 10 and also the reception shutter 30 associated with the reception input port 28. Light is thus transmitted from the output port 10 and illuminates the transmission field 18. If there is an object in the area of overlap 40 between the transmission field 18 and the reception field 36, the object will cause light transmitted in the field 18 to be reflected in the field 36 and the reflected light will be introduced into the reception optical fiber 24 at the input port 28 and will be received at the central optical receiver 22. If no object is present in the area of overlap 40, no light will be reflected. Any signal produced from the optical receiver 22 in response to this activation is buffered by the receiver circuit 48, correlated with the transmitter activation signal by the correlator circuit 50, and processed by the signal processor 52 to produce an output detection signal which may be used in the ways described above. The signal processor 52 then deactivates the central transmitter light source 6, the transmission shutter 14 associated with the transmission output port 10 and the reception shutter 30 associated with the reception input port 28.

The signal processor 52 thirdly activates the central transmitter light source 6, and simultaneously activates the transmission shutter 14 associated with the transmission output port 12 and also the reception shutter 30 associated with the reception input port 26. Light is thus transmitted from the output port 12 and illuminates the transmission field 20. If there is an object in the area of overlap 42 between the transmission field 20 and the reception field 34, the object will cause light transmitted in the field 20 to be reflected in the field 34 and the reflected light will be introduced into the reception optical fiber 24 at the input port 26 and will be received at the central optical receiver 22. If no object is present in the area of overlap 42, no light will be reflected. Any signal produced from the optical receiver 22 in response to this activation is buffered by the receiver circuit 48, correlated with the transmitter activation signal by the correlator circuit 50, and processed by the signal processor 52 to produce an output detection signal which may be used in the ways described above. The signal processor 52 then deactivates the central transmitter light source 6, the transmission shutter 14 associated with the transmission output port 12 and the reception shutter 30 associated with the reception input port 26.

The signal processor 52 fourthly activates the central transmitter light source 6, and simultaneously activates the transmission shutter 14 associated with the transmission output port 12 and also the reception shutter 30 associated with the reception input port 28. Light is thus transmitted from the output port 12 and illuminates the transmission field 20. If there is an object in the area of overlap 44 between the transmission field 20 and the reception field 36, the object will cause light transmitted in the field 20 to be reflected in the field 36 and the reflected light will be introduced into the reception optical fiber 24 at the input port 28 and will be received at the central optical receiver 22. If no object is present in the area of overlap 44, no light will be reflected. Any signal produced from the optical receiver 22 in response to this activation is buffered by the receiver circuit 48, correlated with the transmitter activation signal by the correlator circuit 50, and processed by the signal processor 52 to produce an output detection signal which may be used in the ways described above. The signal processor 52 then deactivates the central transmitter light source 6, the transmission shutter 14 associated with the transmission output port 12 and the reception shutter 30 associated with the reception input port 28.

The signal processor 52 then begins again the above described cycle of activation to detect objects present in the areas of overlap 38, 40, 42 and 44. The cycle is repeated continually until the automobile stops reversing, e.g. when reverse gear is disengaged.

It will be understood that the signal processor 52 may be conveniently implemented in the form of a high-speed, integrated circuit digital signal processor to optimize system performance, size, power consumption and reliability. A range of such digital signal processors is available, and the choice and programming of a particular suitable digital signal processor to carry out the operation shown in the flow chart of FIG. 8 is fully within the ordinary competence of a person skilled in the art, and so will not be described further herein. It will be appreciated that as technology advances, the signal processor 52 may in future be implemented in the form of an optical processor.

It will also be appreciated that, if desired, the central transmitter light source 6 need not be deactivated and re-activated with respective deactivations and re-activations of the shutters 12 and 30, but may instead be continuously activated while the system is in operation.

It will also be appreciated that, if desired, the system may be activated when the car is stationary and in neutral gear or a forward gear, e.g. at a stop light, to warn the driver of other vehicles which may come close.

It will be understood that although the invention has been described in the above embodiment as utilizing two transmitter output ports and two receiver input ports giving four areas of overlap, any number of transmitter output ports may be combined with any number of receiver input ports to give as many areas of overlap as required.

It will be appreciated that light of any frequency may be used for transmission and reception in the system. It will be appreciated that although the term "light" is used the term should not be construed as limiting the frequency used to the visible part of the spectrum; the "light" can be of any frequency (e.g. having a wavelength in the range 0.1 $\mu$m–100 $\mu$m) that can be carried by an optical fiber. For example, light of a lower frequency (e.g. infra-red) would offer an advantage in being able to be transmitted and received through fog, while light of a higher frequency (e.g. ultra-violet) would offer advantages of narrower beam widths and reduced effects of clutter.

It will be appreciated that alternatively to using conventional spherical lenses or GRIN lenses for the beam shaping lenses 16 and 32, other types of lenses such as those employing holographic or binary optics may be used.

It will be appreciated that the object detection system described above affords high levels of design flexibility, and operational durability and reliability, since the light source 6 and the light receiver 22 (together with the associated electrical circuits 46, 48, 50 and 52) can be mounted inboard in the automobile at any desired location, free from harsh physical conditions, the optical fibers 8 and 24 coupling the inboard components to the peripheral ports in the fibers and their associated lenses and shutters.

It will be appreciated that the optical fibers could be of any inorganic or organic compounds which can be formed into an optical waveguide (e.g. plastic or glass) and could be easily bent to conform to the shape of the automobile body or bumper.

It will be appreciated that in order to further reduce rejection of unwanted signals in the receiver, an optical spectral filter (not shown) may be employed to filter received light in the range to which the receiver 74 is responsive (e.g. in the wavelength range $0.8 \pm 0.05$ $\mu$m). It will be appreciated that the spectral filters may be integrated into the material of the lenses 16, 32 (e.g. the lenses may be made of glass of the designation R6870 sold by Schott Glass Technologies, Inc., 400 York Avenue, Duryea, Pa. 18642).

It will be appreciated that with the facility of using a greater number of transmission and reception fields and corresponding areas of overlap therebetween, and with the ability to conform the shape of the optical fibers to any desired contour, the system could be expanded or adapted to cover any desired angle as required. For an automobile the system could cover the sides and the complete front and rear bumpers. In the case of an automobile such as a truck, which has significant ground clearance, the system could also cover the underside of the automobile.

It will be understood that although the invention has been described in the above embodiment as an object detection system for an automobile when reversing, the invention is not limited to use only when reversing nor to use solely in automobiles, for example a system in accordance with the invention could be implemented to provide blind spot detection in ordinary forward driving to ensure safer overtaking.

It will be understood that although the invention has been described above in the preferred embodiment as utilizing transmitter output ports and receiver input ports aligned in a single plane, the transmitter output ports and receiver input ports can be aligned in, or moved to cover, more than one plane if desired, so as to give optimal detection coverage for a particular application. For example for use at very close range it may be desired to move the transmitter output ports and receiver input ports so as to provide detection coverage very near to the ground. It will further be appreciated that, if desired, the pattern of detection coverage could be adapted to suit the speed and steering of the automobile.

It will be understood that, if desired, additionally or alternatively to the signal integration performed by the integrator 96 in the correlator circuit 50, post-reception integration of the received signal may be performed in the signal processor 52 to reduce susceptibility of the system to spurious, short duration light signals.

It will also be appreciated that, if desired, in order to maximize the rejection of unwanted signals such as ambient light or similar signals from other vehicles in heavy traffic, the transmitted optical signal could be modulated or coded as desired and the receiver circuitry could be arranged to respond only to received signals having the appropriate modulation or coding.

It will be understood that an object detection system as described above offers the advantages of multiple fields of view with a single transmitter source and a single receiver detection circuit, low system cost since the system comprises few parts, and high reliability and simplicity of implementation since the system is simple and consists of parts from a mature technology base.

It will be appreciated that various modifications or alternatives to the above described embodiments will be apparent to a person skilled in the art without departing from the inventive concept.

We claim:

1. A system for the detection of objects comprising:
   a source of optical energy;
   a first transmitter port at a first transmitter location for transmitting optical energy to a first field of illumination;
   first fiber optic coupling means coupling the source of optical energy to the first transmitter port;
   a second transmitter port at a second transmitter location spaced from the first transmitter location for transmitting optical energy to a second field of illumination;
   second fiber optic coupling means coupling the source of optical energy to the second transmitter port;
   at least one receiver port embracing a field of reception having a first are of overlap with the first field of illumination and having a second area of overlap with the second field of illumination so as to receive optical energy transmitted from the first or second transmitter port and reflected by an object present in the first or second area of overlap;
   a receiver coupled to the at least one receiver port for producing a signal representative of the optical energy received thereat;
   means for sequentially activating the first and second transmitter ports during each cycle of activation of the system; and
   processing means for processing the signal produced by the receiver to sequentially direct the presence of an object in the first or second area of overlap.

2. A system according to claim 1 wherein the means for sequentially activating the first and second transmitter ports includes shutter means respectively associated with each transmitter port for selectively passing optical energy from the respective transmitter ports.

3. A system according to claim 2 wherein the shutter means each comprise a member movable between first and second positions, the member being substantially transmissive to optical energy from its respective transmitter port in its first position and being substantially non-transmissive to optical energy from its respective transmitter port in its second position.

4. A system according to claim 1 further comprising means for beam shaping associated respectively with each of the ports.

5. A system according to claim 4 wherein each means for beam shaping comprises a lens.

6. A system according to claim 1 wherein the optical energy is visible light.

7. A system according to claim 1 wherein the optical energy is infra-red radiation.

8. A system according to claim 1 wherein the optical energy is ultra-violet radiation.

9. A system according to claim 1 further comprising correlator means for correlating the signal produced by the receiver with a transmission signal so as to reduce detection error.

10. A system according to claim 9 wherein the correlator means comprises:

mixer means for mixing the transmission signal with the signal produced by the receiver to produce a mixed signal; and low-pass filter means for low-pass filtering the mixed signal to reduce non-correlated components therein.

11. A system according to claim 1 further comprising integrator means for integrating the signal produced by the receiver so as to reduce detection error.

12. A system according to claim 1 wherein the source of optical energy comprises a light emitting diode.

13. A system for the detection of objects comprising:
a source of optical energy;
at least one transmitter port coupled to the source of optical energy for transmitting optical energy to a field of illumination;
a first receiver port located at a first location and embracing afield field of reception having a first area of overlap with the field of illumination so as to receive optical energy transmitted form the at least one transmitter port and reflected by an object present in the first area of overlap;
a second receiver port located at a second location spaced from the first location and embracing a second field of reception having a second area of overlap with the field of illumination so as to receive optical energy transmitted by the at lest one transmitter and reflected by an object present in the second area of overlap;
a receiver for receiving optical energy and for producing a signal representative thereof;
fiber optic coupling means coupling to the first and second receiver ports to the receiver;
means for sequentially activating the first and second receiver ports during each cycle of activation of the system; and
processing means for processing the signal produced by the receiver to sequentially detect the presence of an object in the first or second area of overlap.

14. A system according to claim 13 wherein the means for sequentially activating the first and second receiver ports includes shutter means respectively associated with each receiver port for selectively passing optical energy to the respective receiver ports.

15. A system according to claim 14 wherein the shutter means each comprise a member movable between first and second positions, the member being substantially transmissive to optical energy to its respective receiver port in its first position and being substantially non-transmissive to optical energy to its respective receiver port in its second position.

16. A system according to claim 13 further comprising means for beam shaping associated respectively with each of the ports.

17. A system according to claim 13 wherein each means for beam shaping comprises a lens.

18. A system according to claim 13 wherein the optical energy is visible light.

19. A system according to claim 13 wherein the optical energy is infra-red radiation.

20. A system according to claim 13 wherein the optical energy is ultra-violet radiation.

21. A system according to claim 13 further comprising correlator means for correlating the signal produced by the receiver with a transmission signal so as to reduce detection error.

22. A system according to claim 21 wherein the correlator means comprises:
mixer means for mixing the transmission signal with the signal produced by the receiver to produce a mixed signal; and
a low-pass filter means for low-pass filtering the mixed signal to reduce non-correlated components therein.

23. A system according to claim 13 further comprising integrator means for integrating the signal produced by the receiver so as to reduce detection error.

24. A system according to claim 13 wherein the source of optical energy comprises a light emitting diode.

25. A system for use in a vehicle to detect objects in the vicinity of the vehicle, the system comprising:
a source of optical energy;
a plurality of spaced transmitter ports for respectively transmitting optical energy to a plurality of fields of illumination;
transmission fiber optic coupling means coupling the source of optical energy to the plurality of transmitter ports;
a plurality of receiver ports embracing respectively a plurality of fields of reception each having an area of overlap in the vicinity of the vehicle with each of the plurality of fields of illumination so as to receive optical energy transmitted from one of the plurality of transmitter ports and reflected by an object present in an area of overlap;
a receiver for receiving optical energy and for producing a signal representative thereof;
reception fiber optic coupling means coupling the plurality of receiver ports to the receiver;
means for sequentially activating each of the plurality of transmitter ports with each of the plurality of receiver ports during each cycle of activation of the system; and
processing means for processing the signal produced by the receiver in response to each activation to sequentially detect the presence of an object in each of the areas of overlap in the vicinity of the vehicle.

* * * * *

UNITED STATES PATENT AND TRADEMARK OFFICE
CERTIFICATE OF CORRECTION

PATENT NO. : 5,291,261
DATED : 3/1/94
INVENTOR(S) : Dahl et al.

It is certified that error appears in the above-identified patent and that said Letters Patent is hereby corrected as shown below:

Please correct the text of the Terminal Disclaimer Notice on the Title page of the patent to read --The portion of the term of this patent subsequent to August 1, 2010 has been disclaimed.--

Signed and Sealed this

Eleventh Day of October, 1994

*Attest:*

BRUCE LEHMAN

*Attesting Officer*     *Commissioner of Patents and Trademarks*